US009076164B2

(12) United States Patent
Chang et al.

(10) Patent No.: US 9,076,164 B2
(45) Date of Patent: Jul. 7, 2015

(54) METHOD AND APPARATUS FOR PERFORMING TARGETED ADVERTISING IN DOCUMENTS

(75) Inventors: Walter Chang, San Jose, CA (US); Nadia Ghamrawi, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2601 days.

(21) Appl. No.: 11/728,069

(22) Filed: Mar. 23, 2007

(65) Prior Publication Data

US 2014/0244384 A1    Aug. 28, 2014

(51) Int. Cl.
*H04L 9/06* (2006.01)
*G06Q 30/02* (2012.01)

(52) U.S. Cl.
CPC ........ *G06Q 30/0254* (2013.01); *G06Q 30/0251* (2013.01); *G06Q 30/0256* (2013.01); *G06Q 30/0225* (2013.01)

(58) Field of Classification Search
USPC ................................ 705/14; 707/5; 726/2, 27
See application file for complete search history.

(56) References Cited

U.S. PATENT DOCUMENTS

| 2004/0181525 A1* | 9/2004 | Itzhak et al. | 707/5 |
|---|---|---|---|
| 2005/0091106 A1* | 4/2005 | Reller et al. | 705/14 |
| 2005/0229258 A1* | 10/2005 | Pigin | 726/27 |
| 2007/0074270 A1* | 3/2007 | Meehan et al. | 726/2 |
| 2007/0198344 A1* | 8/2007 | Collison et al. | 705/14 |
| 2008/0086779 A1* | 4/2008 | Blake et al. | 726/27 |

* cited by examiner

*Primary Examiner* — John G Weiss
*Assistant Examiner* — Marilyn G Macasiano
(74) *Attorney, Agent, or Firm* — Kilpatrick Townsend & Stockton LLP

(57) ABSTRACT

A method, apparatus and computer program product for performing targeted advertising in documents is presented. A document is identified as having advertisements associated therewith. A statistical ranking of terms derived from said document is received and at least one term is selected from the results to use as a keyword for associating at least one advertisement with the document. The at least one term is stored with the document. When the document is viewed, the document is identified as being enabled to have advertisements associated therewith. The at least one stored term is retrieved from the document and is submitted to an advertisement aggregator. At least one advertisement is received from the advertisement aggregator and is rendered with the document.

24 Claims, 9 Drawing Sheets

METHOD AND APPARATUS FOR PERFORMING TARGETED ADVERTISING IN DOCUMENTS

BACKGROUND

Conventional technologies for presenting advertisements to potential customers provide a variety of mediums in which to present those advertisements. For example, advertisements can be displayed electronically on web sites or via search engines. Advertisements can also be displayed on web sites, for example, via an advertisement banner. Additionally, advertisements can be displayed on search engines via a sponsored advertisement. Advertisers pay for the advertisements by choosing keywords or keyword phrases, and competing against other advertisers who also want their advertisements to appear on web sites relevant to those keywords or keyword phrases.

When an end user enters a web site containing advertisements, the advertisements (for which the advertisers have bid on keyword or keyword phrases) are displayed. The displaying of the advertisements is referred to as an 'impression'. The advertisers do not pay for impressions. However, when an end user selects (i.e., "clicks") on an advertisement, the advertiser is charged for that selection. The advertiser is charged whatever amount the advertiser bid on the keyword or keyword phrase that caused the displaying (i.e., impression) of the advertisement. Each time an end user clicks on the advertisement, the advertiser is charged for that selection. This is known as "pay per click" since the advertiser only pays for the advertisement when an end user selects (i.e., "clicks") on the advertisement. Web site owners also receive a small amount of revenue each time an end user selects (i.e., "clicks") on an advertisement that appears on the web site owner's web site.

Conventional computerized devices, such as personal computers, laptop computers, and the like utilize graphical user interfaces in applications such as operating systems and graphical editors (i.e., web page editors, document editors, video editors, etc.) that enable users to quickly provide input and create projects. In general, using a graphical user interface, a user operates an input device such as a mouse or keyboard to manipulate digital content on a computer display. The digital content is often represented as icons, and the user can operate an input device such as a mouse to move a mouse pointer onto an icon (i.e., graphically overlapping the icon on the graphical user interface). By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer. Using graphical user interface technology, users can create projects by dragging and dropping digital content (i.e., graphical objects, text, text boxes, images, videos, etc) into the project.

People can insert advertisements in their documents presently by selling space within the document, similar to how a magazine publisher would sell advertisement space in their magazine.

Prior art content providers manually provide a few keywords, Ad aggregators try to match with manually provided keywords advertisers provide with ad. Web Search engines use keywords contained in user queries to match against ad keywords of the ads in their pool of advertisers. Web based mail systems such as Gmail compare text in e-mail messages against a large pool of keywords and associated content to determine best ads.

SUMMARY

Conventional mechanisms such as those explained above suffer from a variety of deficiencies. One such deficiency is that conventional advertisement mechanisms such as Adsense (available from Google) deals strictly with website content and places advertisements via dynamic advertisement insertion within the rendered web page. Adsense does not deal with non-website content documents such as Portable Document Format (PDF) documents, files created using a word processing application such as Microsoft Word or WordPerfect, files comprising slides created using Microsoft PowerPoint, files comprising drawings created by Visio or Micrografx, or the like.

In order to sell advertisements requires considerable effort similar to what a magazine publisher would do. The author of the document (e.g., a PDF file) would need to identify potential advertisement sponsors. The author would also need to design how much space the non-website content would have available for advertisement space. Next, the author would have to develop a business model for selling the advertisement space (e.g. identify the circulation numbers, target demographics, advertising rates, and the like). Further, if required for the business model or the potential advertisement sponsors, the author would have to conduct analysis of the reach and effectiveness of the market that the non-website content document reaches. The author would also be required to sell the advertisement space to the advertisement sponsors and insert the sponsor advertisements into the non-website content document.

The above process is costly (e.g., requiring potential market research, a sales team for the advertisements) is static and is not responsive to changes in market. Once an advertisement is inserted into a document, the advertisement it is there for good. As an example, if the advertisement sponsor goes out of business, the document author can only re-sell that advertisement space by creating a new document however, the old document is still out in the market. As another example, if an author has created a compelling document on a topic area, they may find that over time, more and more people would want to have an advertisement in that document and as such, the author could receive a higher rate for that same document over time. Further, the cost of proving in the value of the advertisement and tracking results is very high and can only reasonably be accomplished through sampling. This requires considerable effort, especially for document publishers who would view advertisements as a side benefit to publishing their content versus their entire business model.

Prior art attempts fail to directly and automatically analyze document content and then finds the most relevant ads to show with that content. Current search engine based targeted advertising schemes use search terms provided by the user to match advertisement keywords provided by an advertiser and display advertisements typically in a side panel. For website sidebar or banner advertising, the content hosting service finds advertisements from a pool of advertiser websites by matching advertisement keywords with website content keywords provided explicitly by the content author.

In targeted advertising models, advertisers provide keywords based on their products and the users they are targeting. Web content publishers independently provide keywords based on site topics and user demographics (profiles). The targeted advertising system then uses content/site keywords to find the best (most relevant) advertiser keywords to determine which ads to show on the site. We note that this is a process that requires a fair degree of manual input.

Once ads are selected, these ads are automatically placed on relevant content sites, and possibly within other products such as email programs and newsletters. Search engines such as Google have technology to scan the content and URL of a web page and then automatically display ads whose keywords are similar to the content of the page. As an example, if users look at a web page about building storage sheds, users may see Google ad keywords for storage sheds or tool sheds. Similarly, if a user views a page containing cake recipes, they may see ads about pie recipes, or delicious dessert recipes. Some targeted ad systems attempt to find the most appropriate content sites to display sponsored ads.

Prior art is thus either search engine and search keyword based, or relies on content keywords for websites. Current advertisement generation systems also include a method to present a time-dependent advertisement to a user based on search terms in a search query string during some period of time (e.g., U.S. Pat. No. 7,007,074). This system includes a search engine coupled to a web server for receiving the search query and for presenting a search results page. The search results page is accompanied with an immediate advertisement. The system includes an advertisement repository to store data representing multiple advertisements and includes the immediate advertisement as well as time-dependent advertisement. The system also includes a user profiling mechanism configured to communicate searcher characteristics and a data structure to store these search characteristics. An ad server is used to provide to the web server the immediate ad with an associated search results page and the time-dependent ad with a web page presented after the display of the search results page, until a period of time expires. We note again that users must provide both search keywords, and advertiser must provide ad keywords.

Except for Google GMAIL which finds advertisements based on user e-mail content, other prior art techniques fail to perform content analysis from within a document reader (such as Acrobat reader) or perform advertisement serving for an application other than a browser.

In targeted advertising models, advertisers provide keywords based on their products and the users they are targeting. Web content publishers independently provide keywords based on site topics and user demographics (profiles). The targeted advertising system then uses content/site keywords to find the best (most relevant) advertiser keywords to determine which ads to show on the site.

Embodiments of the invention significantly overcome such deficiencies and provide mechanisms and techniques that provide the ability for authors of documents to include dynamic, contextual targeted advertisements to their content. A user can review and edit a list of candidate advertisement terms received from a statistical ranking of terms derived from the document. The user can then select certain terms as keywords based on how well they return advertisements, and inject the selected advertisement terms back into the document. When the document with advertisement terms is distributed and opened in a reader such as Acrobat Reader, the reader advertisement plug-in uses the injected advertisement terms to find and show advertisements provided by one or more advertisement aggregators.

In a particular embodiment of a method for performing targeted advertising in a document, the method includes identifying a document for having advertisements associated therewith. Results from a of statistical ranking of terms derived from the document are received and at least one term is selected from the results to use as a keyword for associating at least one advertisement with the document. The at least one term is stored with the document.

In another particular embodiment, a method of rendering a document having advertisements associated therewith is described. The method includes identifying that the document has advertisements associated therewith. The method further includes retrieving at least one stored term from the document and submitting the at least one stored term to an advertisement aggregator. At least one advertisement is retrieved from the advertisement aggregator in response to the submitting the at least one stored term to an advertisement aggregator, and the at least one advertisement is rendered with the document.

Other embodiments include a computer readable medium having computer readable code thereon for associating advertisements with a document. The computer readable medium, in a particular embodiment, includes instructions for identifying a document having advertisements associated therewith. The computer readable medium further includes instructions for receiving results of statistical ranking of terms derived from the document and instructions for selecting at least one term from the results to use for associating at least one advertisement with the document. The computer readable medium additionally includes instructions for storing the at least one term with the document.

Yet other embodiments include a computer readable medium having computer readable code thereon for rendering a document having advertisements associated therewith. The computer readable medium includes instructions for identifying that a document is enabled to have advertisements associated therewith, and instructions for retrieving at least one stored term from said document. The computer readable medium further includes instructions for submitting the at least one stored term to an advertisement aggregator and instructions for receiving at least one advertisement from the advertisement aggregator in response to the submitting the at least one stored term to an advertisement aggregator. The computer readable medium additionally includes instructions for rendering the at least one advertisement with the document.

Still other embodiments include a computerized device, configured to process all the method operations, disclosed herein as embodiments of the invention. In such embodiments, the computerized device includes a memory system, a processor, communications interface in an interconnection mechanism connecting these components. The memory system is encoded with a process that provides targeted advertisements in documents as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing targeted advertising in documents as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
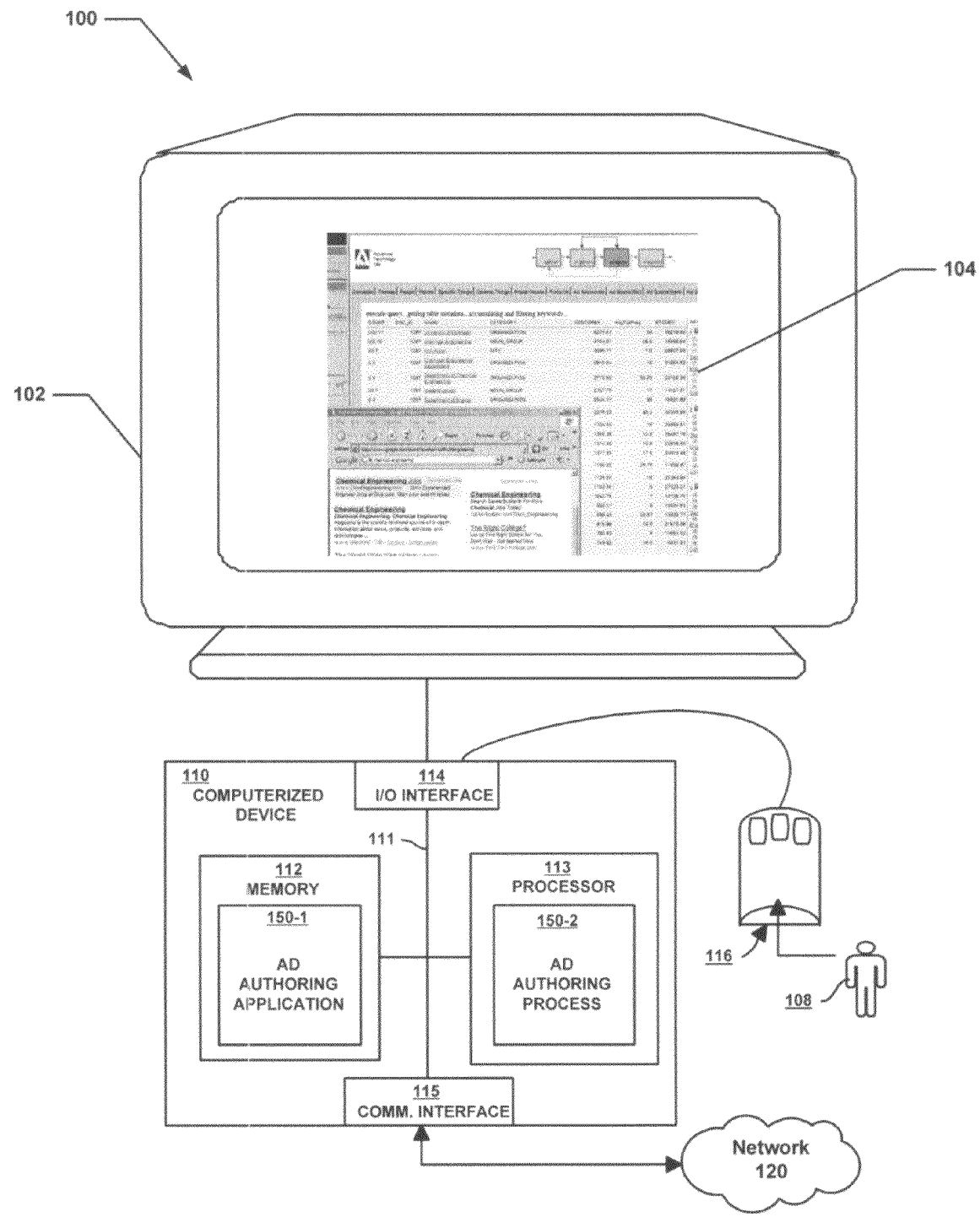
FIG. 1 illustrates an example computer system architecture for a computer system that provides targeted advertisements with a document and rendering a document having targeted advertisements associated therewith in accordance with embodiments of the invention.

FIG. 1 is a block diagram illustrating an example architecture 100 of a computer system 110 that executes, runs, interprets, operates or otherwise performs an targeted advertisement application 540-1 and a targeted advertisement process 150-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the an targeted advertisement application 150-1 and an targeted advertisement process 150-2 provides on the display 102. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network 120.

The memory system 112 is any type of computer readable medium, and in this example, is encoded with a targeted advertisement application 150-1 as explained herein. The targeted advertisement application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the user selected advertising application 140-1. Execution of the targeted advertisement application 140-1 in this manner produces processing functionality in a targeted advertisement process 150-2. In other words, the targeted advertisement process 150-2 represents one or more portions or runtime instances of the targeted advertisement application 150-1 (or the entire targeted advertisement application 150-1) performing or executing within or upon the processor 113 in the computerized device 110 at runtime.

It is noted that example configurations disclosed herein include the targeted advertisement application 150-1 itself (i.e., in the form of un-executed or non-performing logic instructions and/or data). The targeted advertisement application 150-1 may be stored on a computer readable medium (such as a floppy disk), hard disk, electronic, magnetic, optical, or other computer readable medium. The an targeted advertisement application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the targeted advertisement application 150-1 in the processor 113 as the targeted advertisement process 150-2. Those skilled in the art will understand that the computer system 110 may include other processes and/or software and hardware components, such as an operating system not shown in this example.

A display 102 need not be coupled directly to computer system 110. For example, the targeted advertisement application 150-1 can be executed on a remotely accessible computerized device via the network interface 115. In this instance, the graphical user interface 104 may be displayed locally to a user 108 of the remote computer, and execution of the processing herein may be client-server based.

Figure 2:
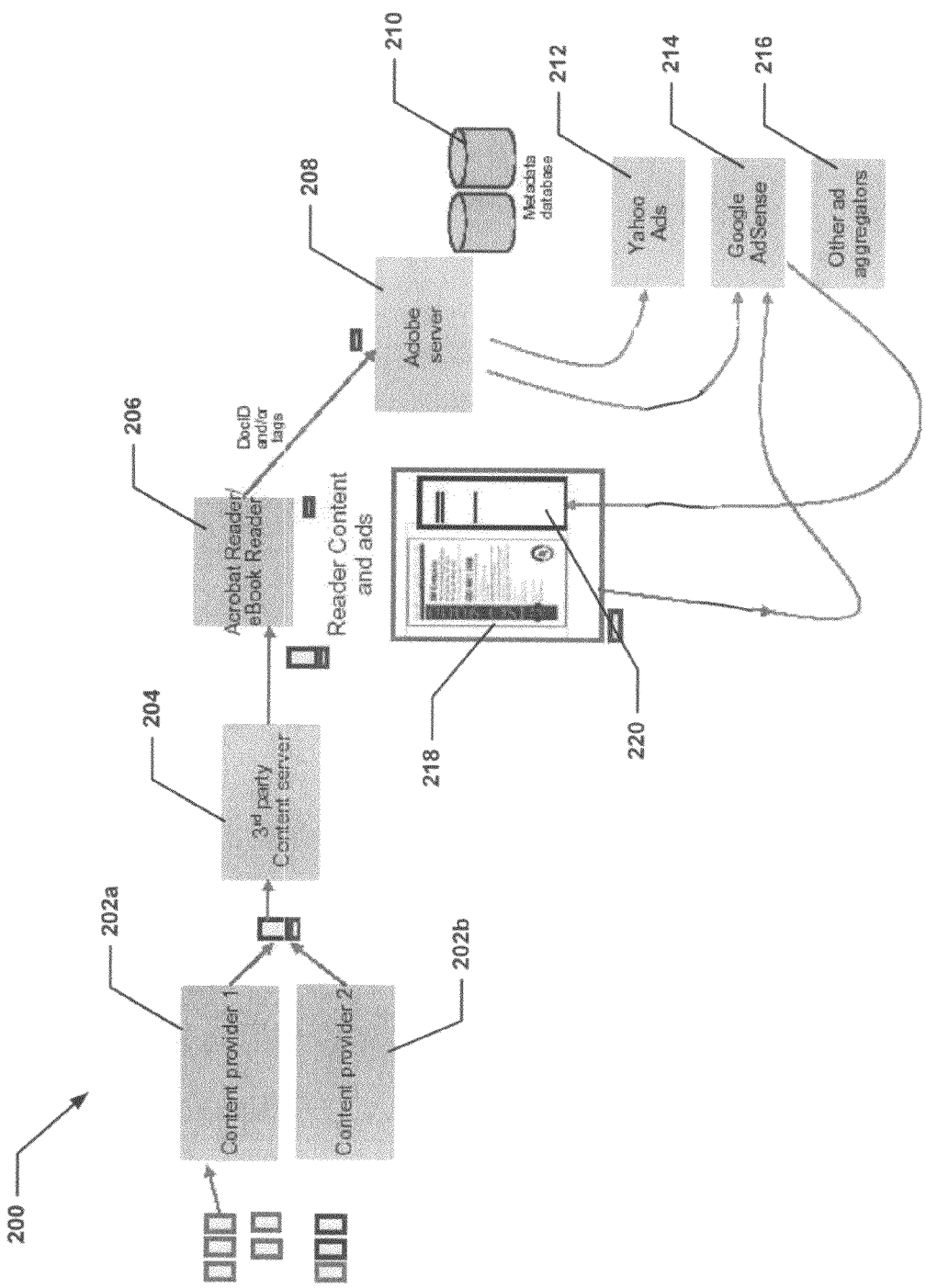
FIG. 2 is a bock diagram of a system for providing targeted advertisements with a document in accordance with embodiments of the invention.

Referring now to FIG. 2, a block diagram of a system 200 for providing targeted advertising with documents is shown. The system includes content providers 202a and 202b, a third party content server 204, a reader 206, a server 208, a metadata database 210 and a plurality of ad aggregators 2121a-c. The resulting document 214 is also shown, having an advertisement 216 associated therewith.

In operation a content provider (e.g. content provider 202a) provides a document to a content server 204. The document may be any type of document, such as Portable Document Format (PDF) documents, files created using a word processing application such as Microsoft Word or WordPerfect, files comprising slides created using Microsoft PowerPoint, files comprising drawings created by Visio or. Micrografx, or the like.

An application is used to read the document. In this example, Acrobat Reader 206 is used to read the document (a PDF document) from content server 204. The server 208 has access to a metadata database 210. In this PDF document, terms have been determined to use as keywords, and have been stored in the Extensible Metadata Platform (XMP) section of the PDF document. The terms are read from the XMP section of the PDF document and are submitted to an advertisement aggregator 212. The advertisement aggregator 212 then provides an advertisement 220 to be rendered with the PDF document. The document 218 is rendered and the advertisement 220 is rendered along with the document.

Figure 3:
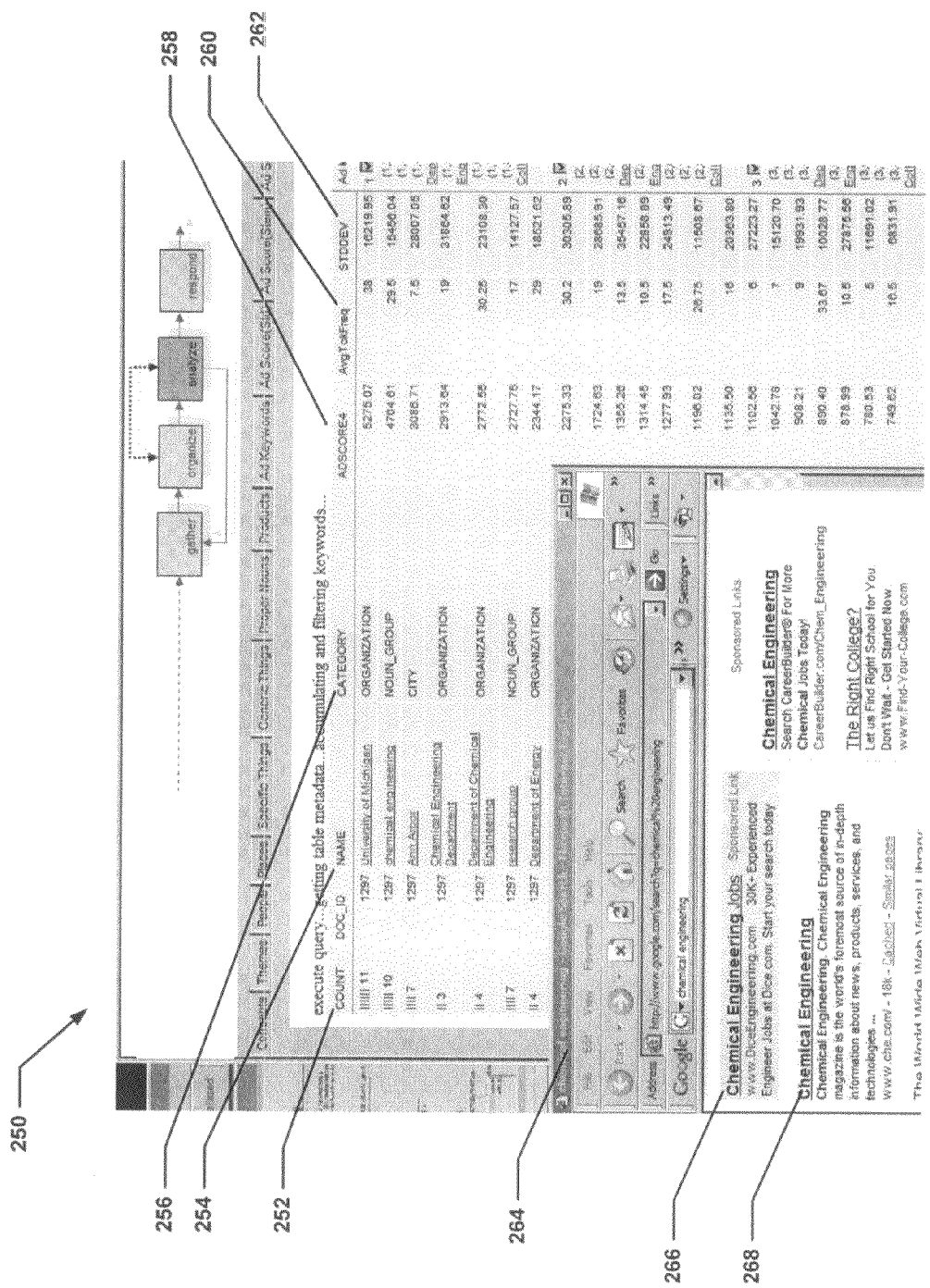
FIG. 3 is a screen shot of a Graphical User Interface (GUI) showing results of a semantic analysis of terms used in selecting terms for associating targeted advertisements with a document in accordance with embodiments of the invention.

FIG. 3 is an example screen shot of a Graphical User Interface (GUI) showing received results of a statistical ranking of terms derived from a document. A description of a statistical ranking of terms from a document is described in detail in co-pending patent application Attorney Docket No. ADO07-006, entitled SEMANTIC ANALYSIS OF DOCUMENTS TO SELECT KEYWORDS, filed on even date herewith, and assigned to the same assignee as the present application, and which is incorporated by reference in it's entirety.

In this example, a graphical user interface (GUI) 250 is provided in the system to display and summarize results of the statistical ranking. In the shown example, a token is defined as any string comprising one or more of a "word" (including misspelled, or fictitious), some punctuation, abbreviation, number, etc. A term is defined as a contiguous grouping of tokens, a mention is defined as an instance of a term in a document, a term is "a word or concept with special significance"; i.e., a term (not just a token or word) that has been set apart, either automatically by an algorithm or by a person, as having special significance. This is not the same as a ranked term, as ranked terms have not been set apart from one another. A ranked term comprises a term with an associated score (used in this invention to help recommend terms).

In the GUI 250, document terms are shown with COUNT (frequency), text, positional (offset) standard deviation, and the actual AdScore ranking. In addition, the terms themselves are enabled so that the actual advertisements from the ad aggregator can be returned to determine how useful the recommended ad term is. COUNT 252 indicates the total occurrences of a specific term, NAME 254 is the term, CATEGORY 256 indicates what type of thing NAME is (person, place, thing, product), ADSCORE 258 is the result of the statistical ranking, AvgTokFreq 260 indicates the mean token frequency, STDDEV 262 is the standard deviation of the offsets of all mentions of the term.

Certain terms can be selected as keywords and a test run which displays the results obtained using the selected term. Inset 262 shows the actual advertisements 264, 266 that were returned using the selected advertisement term or phrase (here Chemical Engineering).

Once terms are reviewed and tested, another set of GUIs allows a user to finalize the terms to use as advertisement keywords for a document. These are indicated by a checkbox. Selected finalists are then injected into the metadata portion of a document (e.g., the XMP section of a PDF) for inclusion in a document.

The final document is then optionally secured using a Digital Rights Management DRM system such as Adobe Policy Server (or other security type system) and is ready for distribution to readers. This may further include encrypting the terms. This may be used to prevent nefarious users from tampering with the terms such that the terms are not disabled or overwritten.

Advertisement serving can also be enabled or disabled at this point if advertisement terms are present. For example, if there is a subscription fee for having advertisements associated with a document, then if the fee has been paid and the subscription is up to date, advertisement serving can be enabled. However if the subscription has expired and/or the fees have not been paid, then advertisement serving can be disabled.

When a user receives/downloads the ad enabled document, the document is viewed in a reader such as Acrobat. The reader contains a plug-in that then retrieves the stored terms in the XMP metadata section of the document and submits the first (or selected subset) of these terms to the designated ad aggregator (e.g., Google or Yahoo.) The plug-in then reads the advertisement links that are provided by the ad aggregator and renders them in a special viewing panel which displays these links for the user to click on if he/she decides to visit the advertisers listed.

Flow charts of particular embodiments of the presently disclosed methods are depicted in FIG. 4 through FIG. 9. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4:
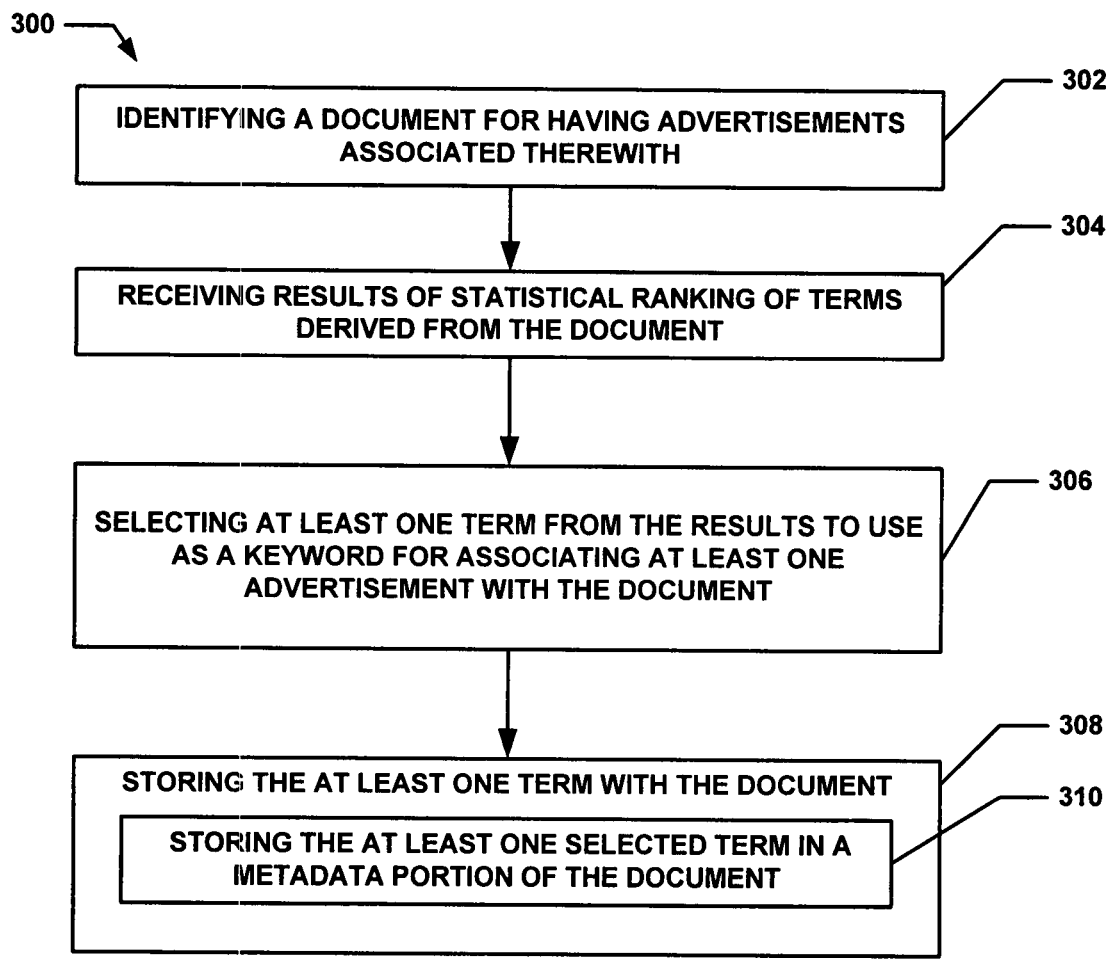
FIG. 4 depicts a flow diagram of a method of associating targeted advertisements with a document in accordance with embodiments of the invention.

Referring to FIG. 4, a flow diagram of a particular embodiment of a method 300 of associating targeted advertisements with a document in accordance with embodiments of the invention is shown. The method 300 begins with processing block 302 which discloses identifying a document for having advertisements associated therewith. The document may be any type of document, such as Portable Document Format (PDF) documents, files created using a word processing application such as Microsoft Word or WordPerfect, files comprising slides created using Microsoft PowerPoint, files comprising drawings created by Visio or Micrografx, or the like.

Processing block 304 states receiving results of statistical ranking of terms derived from the document. In a particular example, a graphical user interface (GUI) is provided in the system to display and summarize results of the statistical ranking. In the GUI, document terms are shown with COUNT (frequency), text, positional (offset) standard deviation, and the actual AdScore ranking.

Processing block 306 recites selecting at least one term from the results to use as a keyword for associating at least one advertisement with the document. In an example, once terms are reviewed and tested, another set of GUIs allows a user to finalize the terms to use as advertisement terms for a document.

Processing continues with processing block 308 which discloses storing the at least one term with the document. As shown in processing block 310, this may further include storing the at least one selected term in a metadata portion of the document. For example, terms can be determined and stored in the Extensible Metadata Platform (XMP) section of a PDF document.

Figure 5:
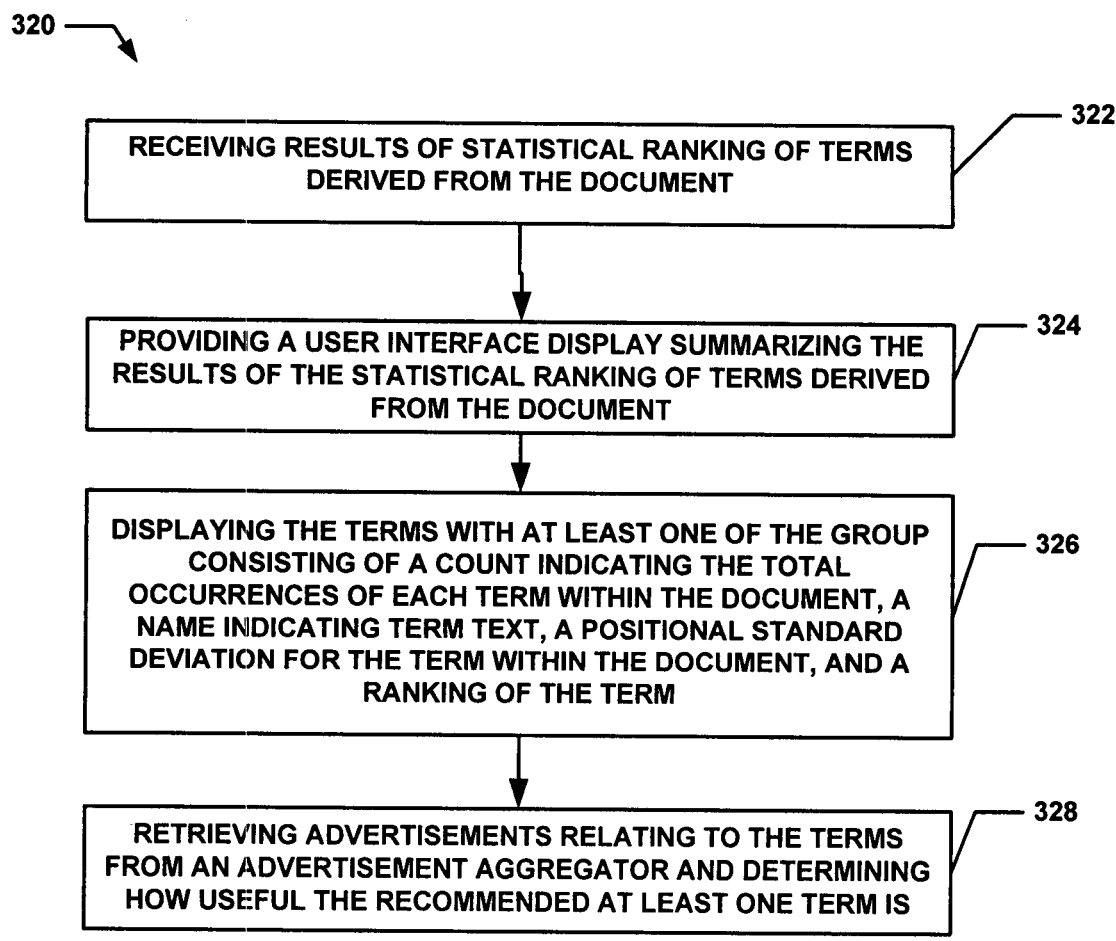
FIG. 5 depicts a flow diagram of a method of selecting terms for associating targeted advertisements with a document in accordance with embodiments of the invention.

Referring now to FIG. 5, a flow diagram of a particular embodiment of a method 320 of selecting terms for associating targeted advertisements with a document in accordance with embodiments of the invention is shown. The method 320 begins with processing block 322 which recites receiving results of statistical ranking of terms derived from the document. In a particular example, a graphical user interface (GUI) is provided in the system to display and summarize results of the statistical ranking. In the GUI, document terms are shown with COUNT (frequency), text, positional (offset) standard deviation, an d the actual AdScore ranking. .

Processing block 324 discloses providing a user interface display summarizing the results of the statistical ranking of terms derived from the document. For example, a graphical user interface (GUI) is provided in the system to display and summarize results of the statistical ranking.

Processing block 326 states displaying the terms with at least one of the group consisting of a count indicating the total occurrences of the text of the term within the document, a name indicating a specific term or terms, a positional standard deviation for the term within the document, and a ranking of the term. In the GUI, document terms are shown with COUNT (frequency), text, positional (offset) standard deviation, and the actual AdScore ranking.

Processing block 328 recites retrieving advertisements relating to the terms from an advertisement aggregator and determining how useful the recommended at least one term is. For example, the terms themselves are enabled so that the actual advertisements from the advertisement aggregator can be returned to determine how useful the recommended advertisement term is.

Figure 6:
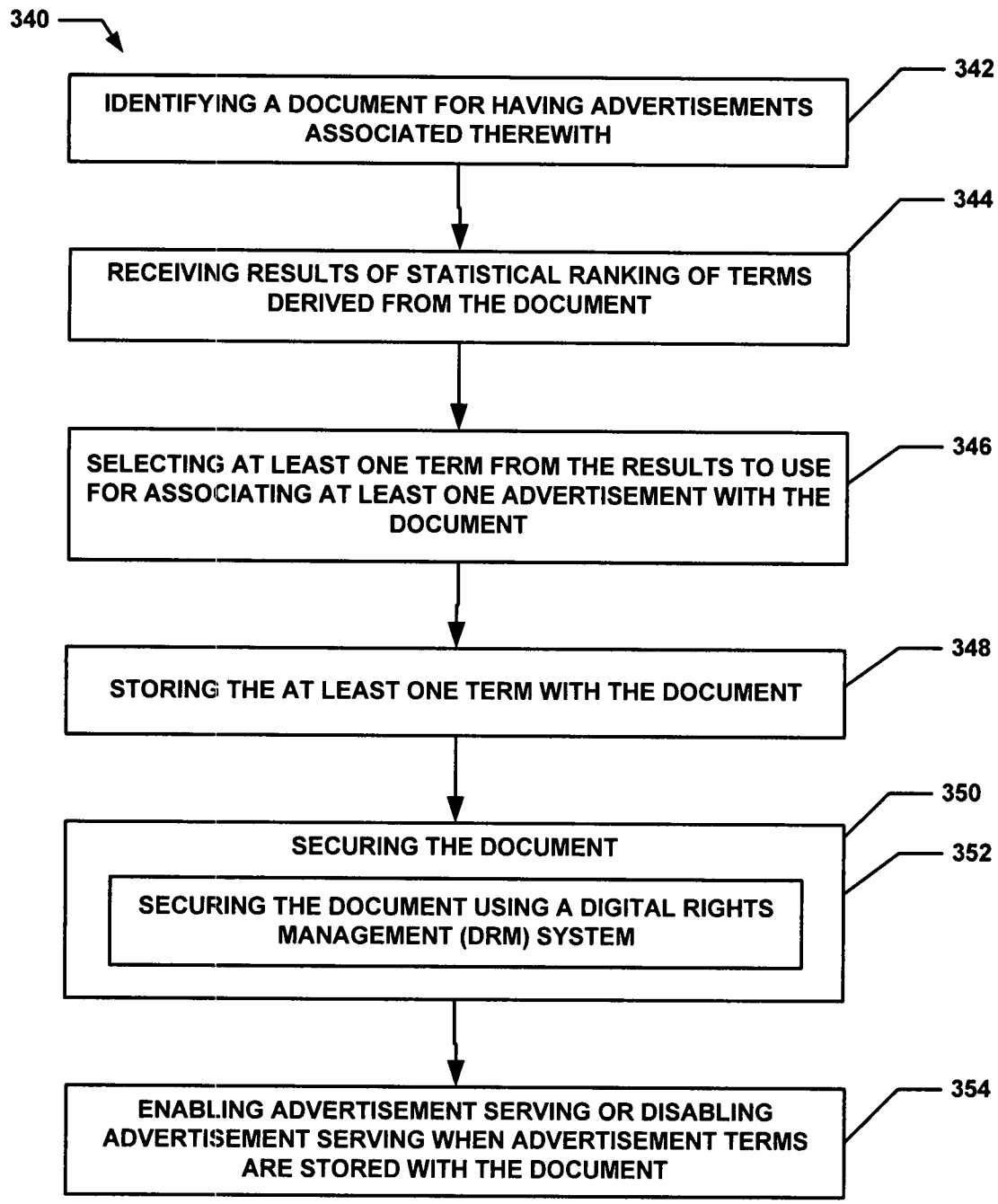
FIG. 6 depicts a flow diagram of a method of associating targeted advertisements with a document, securing the document and enabling or disabling serving in accordance with embodiments of the invention.

Referring now to FIG. 6, a flow diagram of a particular embodiment of a method 340 of associating targeted advertisements with a document, securing the document and enabling or disabling serving in accordance with embodiments of the invention is shown.

The method 340 begins with processing block 342 which discloses identifying a document for having advertisements associated therewith. The document may be any type of document, such as Portable Document Format (PDF) documents, files created using a word processing application such as Microsoft Word or WordPerfect, files comprising slides created using Microsoft PowerPoint, files comprising drawings created by Visio or Micrografx, or the like.

Processing block 344 states receiving results of statistical ranking of terms derived from said document. In a particular example, a graphical user interface (GUI) is provided in the system to display and summarize results of the statistical ranking. In the GUI, document terms are shown with COUNT (frequency), text, positional (offset) standard deviation, and the actual AdScore ranking.

Processing block 346 recites selecting at least one term from said results to use for associating at least one advertisement with said document. In an example, once terms are reviewed and tested, another set of GUIs allows a user to finalize the terms to use as advertisement terms for a document.

Processing block 348 discloses storing the at least one term with said document. For example, terms can be determined and stored in the Extensible Metadata Platform (XMP) section of a PDF document.

Processing block 350 states securing said document. As shown in processing block 352 this may comprise using a Digital Rights Management (DRM) system to secure the document. The final document can be secured using a DRM system such as Adobe Policy Server (or other security type system) and is ready for distribution to readers. This may be used to prevent nefarious users from tampering with the terms such that the terms are not disabled or overwritten.

Processing block 354 recites enabling advertisement serving and disabling advertisement serving when advertisement terms are stored with the document. For example, if there is a subscription fee for having advertisements associated with a document, then if the fee has been paid and the subscription is up to date, advertisement serving can be enabled. However if the subscription has expired and/or the fees have not been paid, then advertisement serving can be disabled.

Figure 7:
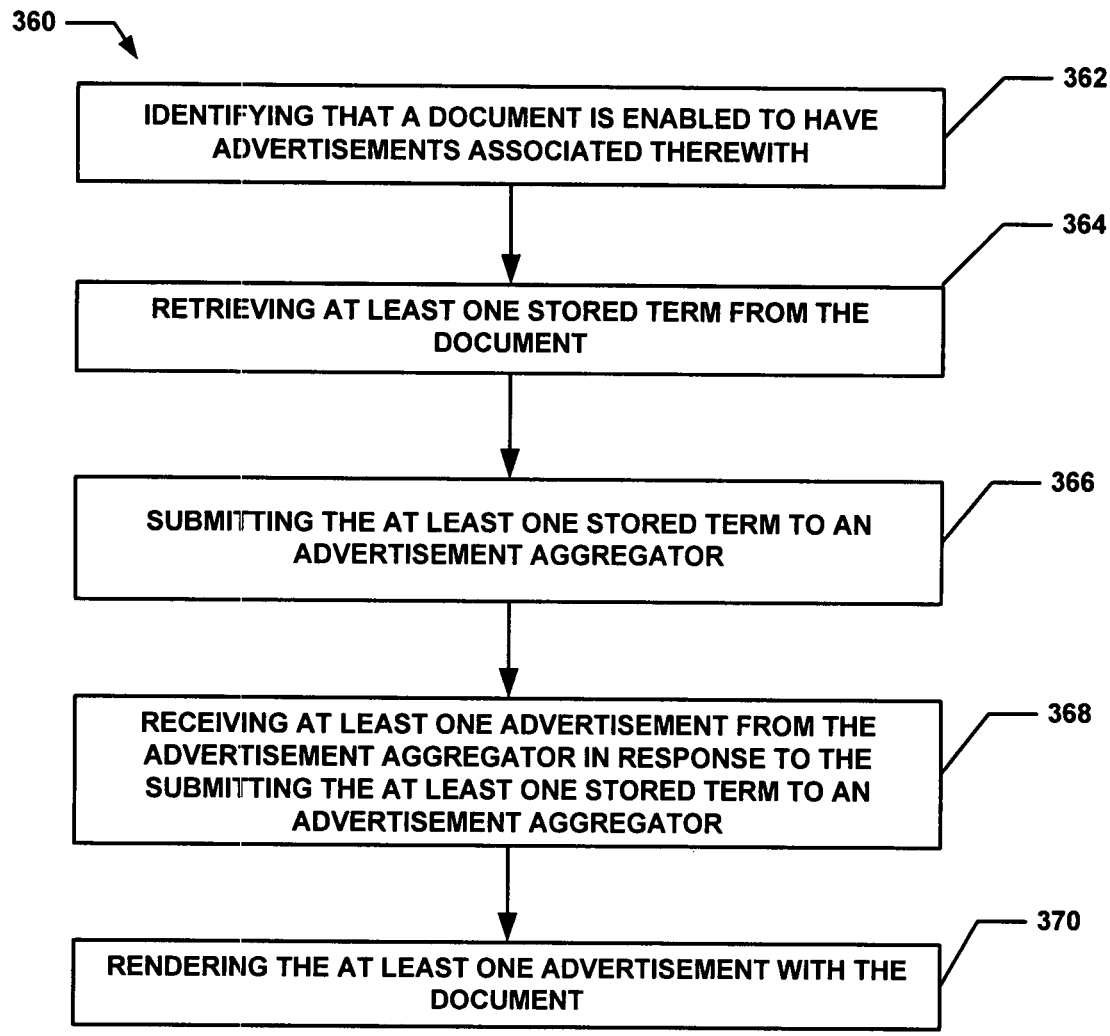
FIG. 7 depicts a flow diagram of a method of rendering a document having targeted advertisements associated therewith in accordance with embodiments of the invention.

Referring now to FIG. 7, a particular embodiment of a method 360 of rendering a document having advertisements associated therewith is shown. The method 360 begins with processing block 362 which discloses identifying that a document is enabled to have advertisements associated therewith. The document may be any type of document, such as Portable Document Format (PDF) documents, files created using a word processing application such as Microsoft Word or WordPerfect, files comprising slides created using Microsoft PowerPoint, files comprising drawings created by Visio or Micrografx, or the like.

Processing block 364 states retrieving at least one stored term from the document. Processing block 366 recites submitting the at least one stored term to an advertisement aggregator. For example, when a user receives/downloads the ad enabled document, the document is viewed in a reader such as Acrobat. The reader contains a plug-in that then retrieves the stored terms in the XMP metadata section of the document and submits the first (or selected subset) of these terms to the designated advertisement aggregator (e.g., Google or Yahoo.)

Processing block 368 discloses receiving at least one advertisement from the advertisement aggregator in response to the submitting the at least one stored term to an advertisement aggregator. Processing block 370 states rendering the at least one advertisement with the document. In one embodiment, the plug-in then reads the advertisement links that are provided by the advertisement aggregator and renders them in a special viewing panel which displays these links for the user to click on if he/she decides to visit the advertisers listed.

Figure 8:
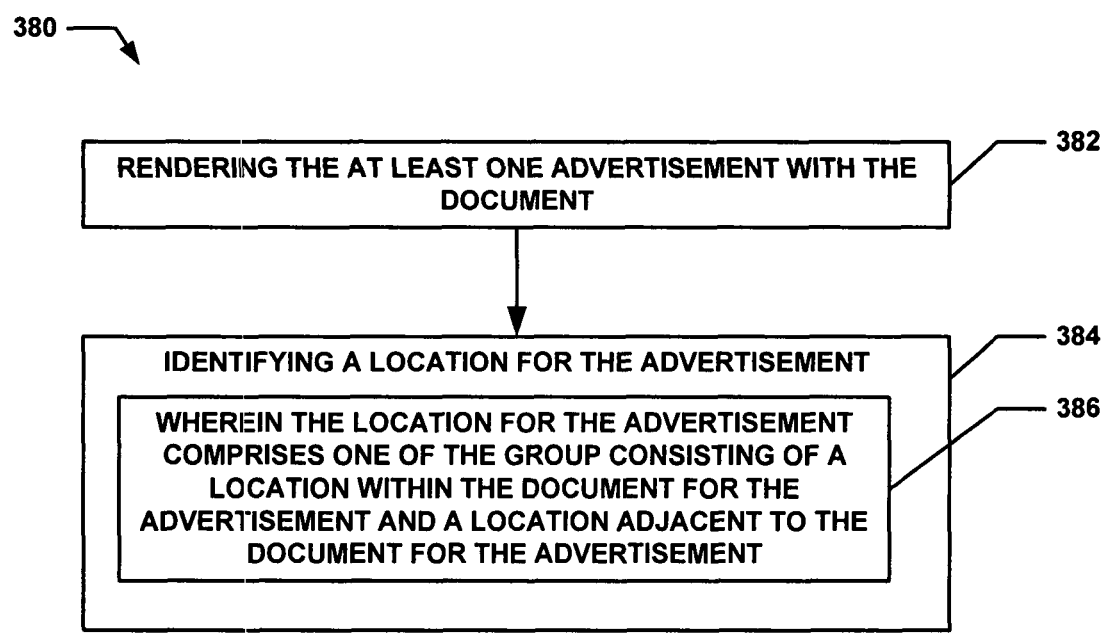
FIG. 8 depicts a flow diagram of a method of determining a location for associating targeted advertisements with a document in accordance with embodiments of the invention.

Referring now to FIG. 8, a flow diagram of a method 380 of determining a location for associating targeted advertisements with a document in accordance with embodiments of the invention is shown. The method 380 begins with processing block 382 which recites rendering the at least one advertisement with the document. The plug-in reads the ad links that are provided by the ad aggregator and renders them in a special viewing panel which displays these links for the user to click on if he/she decides to visit the advertisers listed.

Processing block 384 discloses identifying a location for the advertisement. As shown in processing block 386, this may include wherein the location for the advertisement comprises one of the group consisting of a location within the document for the advertisement and a location adjacent to the document for the advertisement.

Figure 9:
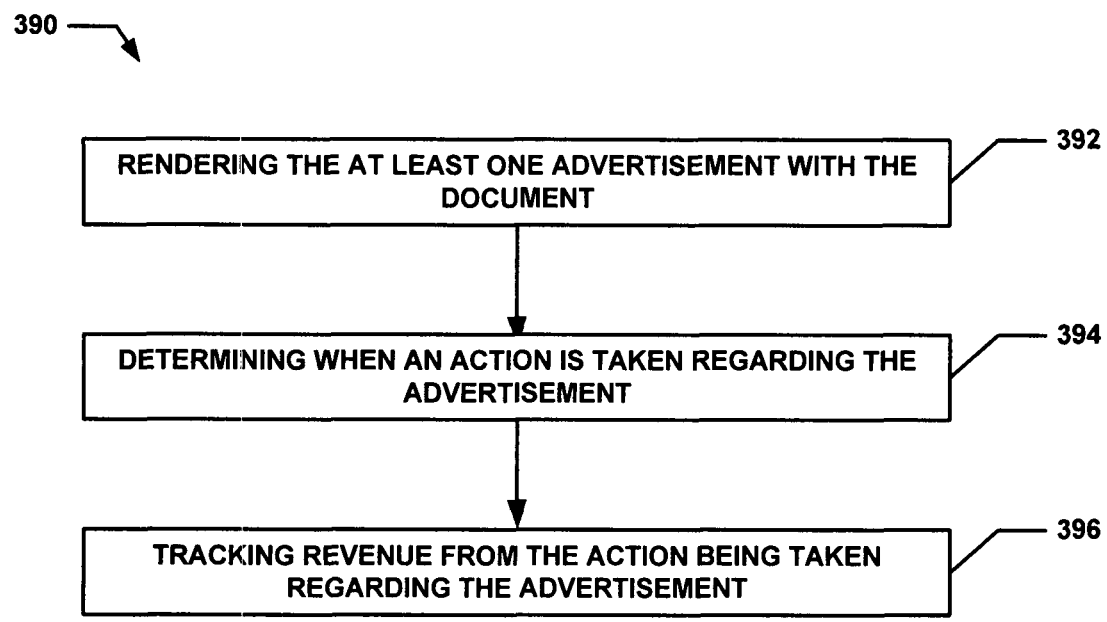
FIG. 9 depicts a flow diagram of a method of tracking revenue regarding an advertisement for a document having targeted advertisements associated therewith in accordance with embodiments of the invention.

Referring now to FIG. 9, a flow diagram of a method of tracking revenue regarding an advertisement for a document having targeted advertisements associated therewith in accordance with embodiments of the invention is shown. The method 390 begins with processing block 392 which states rendering the at least one advertisement with the document. The plug-in then reads the advertisement links that are provided by the advertisement aggregator and renders them in a special viewing panel which displays these links for the user to click on if he/she decides to visit the advertisers listed.

Processing block 394 discloses determining when an action is taken regarding the advertisement, and processing block 396 states tracking revenue from the action being taken regarding the advertisement. When an end user selects (i.e., "clicks") on an advertisement, the advertiser is charged for that selection.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   identifying, at a computer system, a document for having advertisements associated therewith;
   receiving results of statistical ranking of terms derived from said document by the computer system;
   selecting, at the computer system, at least one term from said results to use as a keyword for associating at least one advertisement with said document;
   storing the at least one term in a metadata portion of said document at the computer system.

2. The method of claim 1 wherein said receiving results of statistical ranking of terms derived from said document further comprises providing a user interface display summarizing the results of the statistical ranking of terms derived from said document.

3. The method of claim 2 wherein said receiving results of statistical ranking of terms derived from said document further comprises displaying said terms with at least one of the group consisting of a count indicating the total occurrences of a specific term of said term within said document, a name indicating a specific term or terms, a positional standard deviation for said term within said document, and a ranking.

4. The method of claim 3 further comprising retrieving advertisements relating to said terms from an advertisement aggregator and determining how useful the recommended at least one term is.

5. The method of claim 1 further comprising securing said document using a Digital Rights Management (DRM) system.

6. The method of claim 1 further comprising encrypting said terms.

7. The method of claim 1 further comprising at least one of enabling advertisement serving and disabling advertisement serving when advertisement terms are stored with said document.

8. A method comprising:
   identifying, at a computer system, that a document is enabled to have advertisements associated therewith;
   retrieving at least one stored term from a metadata portion of said document at the computer system;
   submitting, from the computer system, said at least one stored term to an advertisement aggregator;
   receiving, at the computer system, at least one advertisement from said advertisement aggregator in response to said submitting said at least one stored term to an advertisement aggregator; and
   rendering the at least one advertisement with said document.

9. The method of claim 8 further comprising identifying a location for said advertisement, wherein the location for said advertisement comprises one of the group consisting of a location within said document for said advertisement and a location adjacent to said document for said advertisement.

10. The method of claim 8 further comprising determining when an action is taken regarding said advertisement.

11. The method of claim 10 further comprising tracking revenue from said action being taken regarding said advertisement.

12. A computer readable medium having computer readable code thereon, the medium comprising:
   instructions for identifying a document for having advertisements associated therewith;
   instructions for receiving results of statistical ranking of terms derived from said document;
   instructions for selecting at least one term from said results to use for associating at least one advertisement with said document;
   instructions for storing the at least one term in a metadata portion of said document.

13. The computer readable medium of claim 12 wherein said instructions for receiving results of statistical ranking of terms derived from said document further comprises instructions for providing a user interface display summarizing the results of the statistical ranking of terms derived from said document.

14. The computer readable medium of claim 13 wherein said instructions for receiving results of statistical ranking of terms derived from said document further comprises instructions for displaying said terms with at least one of the group consisting of a count indicating the total occurrences of a specific term within said document, a name indicating a specific term or terms, a positional standard deviation for said term within said document, and a ranking of said term.

15. The computer readable medium of claim 14 further comprising instructions for retrieving advertisements relating to said terms from an advertisement aggregator and determining how useful the recommended at least one term is.

16. The computer readable medium of claim 13 further comprising instructions for securing said document using a Digital Rights Management (DRM) system.

17. The computer readable medium of claim 13 further comprising instructions for encrypting said terms.

18. The computer readable medium of claim 13 further comprising instructions for at least one of enabling advertisement serving and disabling advertisement serving when advertisement terms are stored with said document.

19. A computer readable medium having computer readable code thereon for rendering a document having advertisements associated therewith, the medium comprising:
  instructions for identifying that a document is enabled to have advertisements associated therewith;
  instructions for retrieving at least one stored term from a metadata portion of said document;
  instructions for submitting said at least one stored term to an advertisement aggregator;
  instructions for receiving at least one advertisement from said advertisement aggregator in response to said submitting said at least one stored term to an advertisement aggregator; and
  instructions for rendering the at least one advertisement with said document.

20. The computer readable medium of claim 19 further comprising instructions for identifying a location for said advertisement, wherein the location for said advertisement comprises one of the group consisting of a location within said document for said advertisement and a location adjacent to said document for said advertisement.

21. The computer readable medium of claim 19 further comprising instructions for determining when an action is taken regarding said advertisement.

22. The computer readable medium of claim 21 further comprising instructions for tracking revenue from said action being taken regarding said advertisement.

23. A computer system comprising:
  a memory;
  a processor;
  a communications interface;
  an interconnection mechanism coupling the memory, the processor and the communications interface; and
  wherein the memory is encoded with an application associating advertisements with a document, that when performed on the processor, provides a process for processing information, the process causing the computer system to perform the operations of:
  identifying a document for having advertisements associated therewith;
  receiving results of statistical ranking of terms derived from said document;
  selecting at least one term from said results to use as a keyword for associating at least one advertisement with said document;
  storing the at least one term in a metadata portion of said document.

24. The computer system of claim 23 wherein the computer system performs the operations of:
  identifying that a document is enabled to have advertisements associated therewith;
  retrieving at least one stored term from a metadata portion of said document;
  submitting said at least one stored term to an advertisement aggregator;
  receiving at least one advertisement from said advertisement aggregator in response to said submitting said at least one stored term to an advertisement aggregator; and
  rendering the at least one advertisement with said document.

* * * * *